United States Patent
Wu et al.

(10) Patent No.: US 12,374,049 B1
(45) Date of Patent: Jul. 29, 2025

(54) HUMAN BODY POSE ESTIMATION METHOD BASED ON RADIO FREQUENCY HEATMAP DATA ENHANCEMENT

(71) Applicant: Hangzhou Dianzi University, Hangzhou (CN)

(72) Inventors: Yingxiao Wu, Hangzhou (CN); Zhongmin Jiang, Hangzhou (CN); Jianping Han, Hangzhou (CN); Zhiyuan Zhou, Hangzhou (CN); Wenxiang Wang, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 0 days.

(21) Appl. No.: 19/192,434

(22) Filed: Apr. 29, 2025

(30) Foreign Application Priority Data

Dec. 3, 2024 (CN) .......................... 202411759115.9

(51) Int. Cl.
*G06T 17/20* (2006.01)
*G06T 7/73* (2017.01)

(52) U.S. Cl.
CPC .............. *G06T 17/20* (2013.01); *G06T 7/73* (2017.01); *G06T 2207/20044* (2013.01); *G06T 2207/20084* (2013.01)

(58) Field of Classification Search
None
See application file for complete search history.

(56) References Cited

U.S. PATENT DOCUMENTS 7,567,205 B1 * 7/2009 Lee .......................... G06T 15/06
345/426

FOREIGN PATENT DOCUMENTS

CN 110045347 B 7/2019
CN 113486772 B 10/2021
(Continued)

OTHER PUBLICATIONS

Kaikai Deng, Dong Zhao, Zihan Zhang, Shuyue Wang, Wenxin Zheng, Huadong Ma, "Midas++: Generating Training Data of mmWave Radars From Videos for Privacy-Preserving Human Sensing With Mobility", Oct. 18, 2023, IEEE, IEEE Transactions on Mobile Computing, vol. 23, Issue 6, pp. 6650-6666.*

(Continued)

*Primary Examiner* — Robert Bader
(74) *Attorney, Agent, or Firm* — JEEN IP LAW, LLC

(57) ABSTRACT

A human body pose estimation method based on radio frequency heatmap data enhancement is provided, including the following steps: firstly, obtaining the mesh data of human body pose, simulating a radar by using a physical optics method, and obtaining human body mesh features including a radar cross section by irradiating a human body mesh model; secondly, processing the human body mesh features including radar cross section to obtain preliminary simulated radar heatmaps; then inputting the preliminary simulated radar heatmaps into a heatmap conversion network map2map based on U-net, outputting synthetic radar heatmaps, and performing training; finally, combining the synthetic radar heatmaps with real radar heatmaps to construct a mixed data set, obtaining a human body pose skeleton through a human body pose estimation network based on the radar heatmaps, and performing training to complete the human body pose estimation.

6 Claims, 19 Drawing Sheets

(56) References Cited

FOREIGN PATENT DOCUMENTS

| | | |
|---|---|---|
| CN | 115345906 A | 11/2022 |
| CN | 117665805 A | 3/2024 |
| CN | 118068318 B | 5/2024 |
| WO | 2023131422 A1 | 7/2023 |
| WO | 2023244649 A2 | 12/2023 |

OTHER PUBLICATIONS

Kaikai Deng, Dong Zhao, Wenxin Zheng, Yue Ling, Kangwen Yin, Huadong Ma, "G3R: Generating Rich and Fine-Grained mmWave Radar Data From 2D Videos for Generalized Gesture Recognition", Nov. 20, 2024, IEEE, IEEE Transactions on Mobile Computing, vol. 24, Issue 4, pp. 2917-2934.*
Cong Yu, Dongheng Zhang, Zhi Wu, Chunyang Xie, Zhi Lu, Yang Hu, Yang Chen, "MobiRFPose: Portable RF-Based 3D Human Pose Camera", Sep. 13, 2023, IEEE, IEEE Transactions on Multimedia, vol. 26, pp. 3715-3727.*
Mingmin Zhao, Yonglong Tian, Hang Zhao, Mohammad Abu Alsheikh, Tianhong Li, Rumen Hristov, Zachary Kabelac, Dina Katabi, Antonio Torralba, "RF-Based 3D Skeletons", Aug. 7, 2018, Acm, Sigcomm '18: Proceedings of the 2018 Conference of the ACM Special Interest Group on Data Communication, pp. 267-281.*
Arindam Sengupta, Feng Jin, Renyuan Zhang, Siyang Cao, "mm-Pose: Real-Time Human Skeletal Posture Estimation Using mmWave Radars and CNNs", May 1, 2020, IEEE, IEEE Sensors Journal, vol. 20, Issue 17, pp. 10032-10044.*
Chunyang Xie, Dongheng Zhang, Zhi Wu, Cong Yu, Yang Hu, Yan Chen, "RPM: RF-Based Pose Machines", Apr. 19, 2023, IEEE, IEEE Transactions on Multimedia, vol. 26, pp. 637-649.*
Guangzheng Li, Ze Zhang, Hanmei Yang, Jin Pan, Dayin Chen, Jin Zhang, "Capturing Human Pose Using mmWave Radar", Mar. 27, 2020, IEEE, 2020 IEEE International Conference on Pervasive Computing and Communications Workshops (PerCom Workshops).*
Jiamu Li, Dongheng Zhang, Zhi Wu, Cong Yu, Yadong Li, Qi Chen, Yang Hu, Qibin Sun, Yan Chen, "SBRF: A Fine-Grained Radar Signal Generator for Human Sensing", Jul. 12, 2024, IEEE, IEEE Transactions on Mobile Computing, vol. 23, Issue 12, pp. 13114-13130.*
Eugene F. Knott, "Radar Cross Section", 1988, Artech House, Aspects of Modern Radar, E. Brookner, Ed., Chapter 11.*
Christopher Gerekos, Alessandro Tamponi, Leonardo Carrer, Davide Castelletti, Massimo Santoni, Lorenzo Bruzzone, "A Coherent Multilayer Simulator of Radargrams Acquired by Radar Sounder Instruments", Jul. 24, 2018, IEEE, IEEE Transactions on Geoscience and Remote Sensing, vol. 56, Issue 12, pp. 7388-7404.*
Tiantian Feng, Tie Li, Gang Li, Yongdiao Wen, Haijun He, Sihan Zhao, "RCS Simulation of Partly Coated Electrically Large Target with SBR Method", Oct. 26, 2024, IEEE, 2024 14th International Symposium on Antennas, Propagation and EM Theory (ISAPE).*
Yu Cong,"Human Pose Estimation and Visual Synthesis with Wireless Signa", China Doctoral Dissertation Full-text Database Information Technology Series, Issue 03, Mar. 15, 2024, Text pp. 36-42,49,89.
Mngxiao Wu et al,mmHPE: "Robust Multiscale 3-D HumanPose", IEEE Internet of Things Journal, Oct. 8, 2024, Full Text.

* cited by examiner

HUMAN BODY POSE ESTIMATION METHOD BASED ON RADIO FREQUENCY HEATMAP DATA ENHANCEMENT

CROSS-REFERENCE TO RELATED APPLICATIONS

This application claims priority to Chinese Patent Application No. 202411759115.9, filed on Dec. 3, 2024, the contents of which are hereby incorporated by reference.

TECHNICAL FIELD

The disclosure relates to the technical field of wireless intelligent sensing, and in particular to a human body pose estimation method based on radio frequency heatmap data enhancement of physical optics method.

BACKGROUND

Human body pose estimation has important application value in medical rehabilitation, intelligent monitoring, virtual reality, augmented reality, human-computer interaction and other fields. Traditional visual sensors (such as optical camera and depth camera) perform well in pose estimation, but they are susceptible to light conditions, occlusions, and privacy concerns. Radio frequency (RF) sensing technology, as a new non-visual sensing method, can work normally in low light and complex environment, and has the ability to penetrate objects, so it has great potential in human body pose estimation.

At present, human body pose estimation based on millimeter-wave radar and other radio frequency technologies has attracted more and more attention. However, the existing human body pose data acquisition based on radar faces the problems of insufficient quantity and difficult acquisition. Because of the complexity of radar system and the expensive equipment price, it is very difficult to construct large-scale and accurate radar pose data set, which directly affects the training and performance optimization of pose estimation model. Meanwhile, the data generated by radar is sparse and the pose information reflected is limited, so it is difficult to accurately capture the details of human body, which brings challenges to high-precision pose estimation.

As a classical method based on electromagnetic wave propagation theory, Physical Optics (PO) method is capable of accurately simulating the behavior of an object under the irradiation of radio frequency signals by simulating the interaction between electromagnetic waves and objects. When radio-frequency waves contact with objects, electromagnetic waves will be reflected, refracted, diffracted and scattered. By calculating these phenomena, the physical optics method may effectively restore the interaction process between radio frequency waves and complex targets such as human body, thus generating a more accurate radio frequency heatmap of human body. The radio frequency heatmap is input into the neural network for fine adjustment, and a heatmap very similar to the real radar is obtained.

SUMMARY

Aiming at the shortcomings of the prior art, the disclosure provides a human body pose estimation method based on radio frequency heatmap data enhancement. Based on the existing radio frequency sensing technology, the radio frequency heatmap data enhancement method based on physical optics is capable of effectively alleviating the problems of sparse and insufficient data and improve the accuracy and robustness of human body pose estimation.

The specific technical scheme is as follows:

a human body pose estimation method based on radio frequency heatmap data enhancement includes the following steps:

step S1, obtaining mesh data of human body pose by using a sensor;

step S2, simulating a radar by using a physical optics method, constructing a human body mesh model based on the mesh data, and irradiating the human body mesh model to obtain human body mesh features including a radar cross section;

step S3, processing the human body mesh features including the radar cross section obtained in S2 to obtain preliminary simulated radar heatmaps, including a range-azimuth heatmap, a range-elevation heatmap and a range-Doppler heatmap;

step S4, inputting the preliminary simulated radar heatmaps into a heatmap conversion network map2map based on U-net, outputting synthetic radar heatmaps, and performing training;

step S5, combining the synthetic radar heatmaps with real radar heatmaps to construct a mixed data set, obtaining a human body pose skeleton through a human body pose estimation network map2pose based on the radar heatmaps, and performing training to complete the human body pose estimation.

Further, the step S2 is realized by the following sub-steps:

S21, simulating a plane wave $E^i$ emitted by the radar, and irradiating a target human body mesh model; supposing that the target human body mesh model S includes N triangular facets, and according to the physical optics method and a Stratton-Chu formula, a surface scattering field $E_n^s$ of one of the irradiated facets S is defined as follows:

$$E_n^s = \frac{jk}{4\pi} \frac{e^{-jkr_n}}{r_n} \int_{s_n} (ZJ_{s_n} - s \times M_{s_n}) e^{jkr_n \cdot (i-s)} ds_n \quad (1)$$

where i and s are unit vectors of an incidence direction and an observation direction, respectively; $r_n$ is a position vector of a facet $S_n$, and $r_n$ is a range from the radar to a target facet $S_n$; k and Z are wave number and wave impedance in free space, respectively; $J_{s_n}$ and $M_{s_n}$ respectively represent surface current and surface magnetic current of the facet $S_n$; e is a natural constant and i is an imaginary unit.

S22, then a value $\sigma_n$ of the radar cross section (RCS) of the facet $S_n$ at an observation point:

$$\sigma_n = 4\pi R_n^2 \frac{|E_n^s|^2}{|E_n^i|^2} \quad (2)$$

where $E_n^i$ is an incident electric field of the facet $S_n$; $R_n$ is a range from facet $S_n$ to the observation point. The above calculation formula is repeated, and N triangular facets in the human body mesh model S are calculated to obtain the human body mesh features including RCS.

Further, the step S3 is realized by the following sub-steps:

S31, each of facets has a calculated RCS $\sigma_n$, and coordinates of the facets in a three-dimensional space are marked as:

$$S=\{a_i; i=1,2,3,\ldots,N\} \quad (3)$$

where $a_i=(x_i, y_i, z_i)$ are coordinates of a centroid of each of the triangular facets in three-dimensional Cartesian space;

S32, converting a position of each of the facets of the mesh model into a radar spherical coordinate system, and conversion formulas are:

$$\begin{cases} r_i = \sqrt{x_i^2 + y_i^2 + z_i^2} \\ \theta_i = \arccos\left(\dfrac{z_i}{r_i}\right) \\ \varphi_i = \arctan\left(\dfrac{y_i}{x_i}\right) \end{cases} \quad (4)$$

where $b_i=(r_i, \theta_i, \varphi_i)$ are coordinates in radar space and $r_i$ is a radial range of the facets from the radar; $\theta_i$ is the elevation of radar; $\varphi_i$ is the azimuth of radar;

S33, dispersing a whole radar space into a plurality of angle bins corresponding to each of pixels of a heatmap; setting a resolution of the heatmap to be Q×Q, and spatial information corresponding to each of the pixels is:

$$\begin{cases} \Delta\theta = \dfrac{\theta_{max} - \theta_{min}}{Q} \\ \Delta\varphi = \dfrac{\varphi_{max} - \varphi_{min}}{Q} \\ \Delta r = \dfrac{r_{max} - r_{min}}{Q} \\ \Delta v = \dfrac{v_{max} - v_{min}}{Q} \end{cases} \quad (5)$$

where $\Delta\theta$ is the elevation, $\Delta\varphi$ is the azimuth, $\Delta r$ is a range, $\Delta v$ is a velocity, and $\theta_{max}$ and $\theta_{min}$ are a maximum value and a minimum value of the elevation; $\varphi_{max}$ and $\varphi_{min}$ are a maximum value and a minimum value of the azimuth; $r_{max}$ and $r_{min}$ are a maximum value and a minimum value of the range; and $v_{max}$ and $v_{min}$ are a maximum value and a minimum value of the velocity; for range-azimuth heatmaps, each pixel (m, n) corresponds to $(r_m, \varphi_n)$, and signal intensity of all the facets at the angle is accumulated as follows:

$$P_{ra}(m, n) = \sum_{i=1}^{N} \sigma_i I\left(r_m - \frac{\Delta r}{2} \le r_i \le r_m + \frac{\Delta r}{2}\right) \cdot I\left(\varphi_n - \frac{\Delta\varphi}{2} \le \varphi_i \le \varphi_n + \frac{\Delta\varphi}{2}\right) \quad (6)$$

where I( ) is an indicator function, used to judge whether the facets are within an angular range of a current pixel; similarly, a range-elevation heatmap is calculated as follows:

$$P_{re}(m, n) = \sum_{i=1}^{N} \sigma_i I\left(r_m - \frac{\Delta r}{2} \le r_i \le r_m + \frac{\Delta r}{2}\right) \cdot I\left(\theta_n - \frac{\Delta\theta}{2} \le \theta_i \le \theta_n + \frac{\Delta\theta}{2}\right) \quad (7)$$

For the range-Doppler heatmap, a change of a radial range r for centroid $b_i$ of facet i moving from time $t_1$ to time $t_2$ is defined as $\Delta r_{b_i}$, and a velocity of $$b_i \text{ is } v_i = \frac{\Delta r_{b_i}}{t_2 - t_1};$$

then the range-Doppler heatmap is calculated as follows:

$$P_{rd}(m, n) = \sum_{i=1}^{N} \sigma_i I\left(r_m - \frac{\Delta r}{2} \le r_i \le r_m + \frac{\Delta r}{2}\right) \cdot I\left(v_n - \frac{\Delta v}{2} \le v_i \le v_n + \frac{\Delta v}{2}\right) \quad (8)$$

Further, the step S4 is realized by the following sub-steps:

S41, three preliminary heatmaps, namely range-azimuth heatmap, range-elevation heatmap and range-Doppler heatmap, are superimposed in a channel dimension to obtain input feature data $map_{coarse}$ with a shape of (3, Q, Q);

S42, constructing a map2map network based on the U-net, and inputting $map_{coarse}$ into the network to obtain an output $map_{fine}$ with a shape of (3, Q, Q); the map2map network includes an Encoder and a Decoder:

$$F_0 = \text{Encoder}(map_{coarse}, \theta^e) \quad (9)$$

$$map_{fine} = \text{Decoder}(F_0, \theta^d) \quad (10)$$

where $F_0$ is an intermediate feature; $\theta^e$ and $\theta^d$ are learnable parameters of a network module; and S43, training the map2map network based on the U-net, and using Adam optimizer to minimize a mean square error loss between $map_{coarse}$ and $map_{fine}$; map2map network may accurately generate radar heatmaps.

Further, the step S41 is realized by following sub-steps:

S411, Encoder includes h layers of two-dimensional convolution (Conv2d), and each layer uses two-dimensional maximum pooling (MaxPool2d) and two-dimensional batch normalization (BatchNorm2d), and an activation function is ReLU, the intermediate feature $F_0$ is obtained.

S412, Decoder includes h layers of two-dimensional deconvolution (ConvTranspose2d), and each layer uses two-dimensional batch normalization (BatchNorm2d), and an activation function is ReLU. The final network output $map_{fine}$ is in the shape of (3, Q, Q).

Further, the step S5 is realized by the following sub-steps:

S51, mixing a final synthetic heatmap $map_{fine}$ with the real radar heatmap $map_{real}$ to obtain $map_{mix}$, and inputting $map_{mix}$ into the map2pose network based on convolutional neural network (CNN), gated recurrent unit (GRU) and graph convolutional network (GCN) to obtain the human body pose skeleton; map2pose is defined as follows:

$$F_{1,i} = CNN_i(map_i, \theta_i^c); i \in \{ra, re, rd\} \quad (11)$$

$$F_{2,i} = GRU_i(F_{1,i}, \theta_i^g); i \in \{ra, re, rd\} \quad (12)$$

$$F_3 = \text{AdaptiveFusion}(F_{2,ra}, F_{2,re}, F_{2,rd}, \theta^a) \quad (13)$$

$$F_4 = GCN_{temporal}(F_3, \theta^{gt}) \quad (14)$$

$$F_5 = \text{Reshape}(F_4) \quad (15)$$

$$F_6 = GCN_{spatial}(F_5, \theta^{gs}) \quad (16)$$

$$F_{pose} = MLP(F_6, \theta^m) \quad (17)$$

where $map_i$, $i\in\{ra, re, rd\}$ is a result of $map_{mix}$ segmentation according to the channel dimension, and a shape is (1, Q, Q); $CNN_i$, $i\in\{ra,re,rd\}$ is a convolutional neural network, $GRU_i$, $i\in\{ra,re,rd\}$ is a gated recurrent unit, AdaptiveFusion is an adaptive fusion module, Reshape is a feature shape adjustment, $GCN_{temporal}$ and $GCN_{spatial}$ are graph convolutional neural networks, and MLP is a multilayer perceptron; $F_{j,i}$, $i\in\{ra,re,rd\}$ and $j\in\{1, 2, 3, 4, 5, 6\}$ are intermediate features; $\theta_i^c$, $\theta_i^g$, $i\in\{ra,re,rd\}$, $\theta^a$, $\theta^{gt}$, $\theta^{gs}$ and $\theta^m$ are learnable parameters of each network module; and $F_{pose}$ is a final output; and S52, training the map2pose network and using the Adam optimizer to minimize an average absolute error loss between a label value and a predicted value $F_{pose}$; map2pose network is capable of accurately estimating the target human body pose.

To sum up, the disclosure uses the physical optics method to simulate radar to irradiate human body targets, projecting the three-dimensional target human body mesh model with RCS value into the two-dimensional space of radar by projection method, and obtaining the range-azimuth heatmap, range-elevation heatmap and range-Doppler heatmap, inputting the preliminary radar two-dimensional heatmap into the map2map network based on U-net to obtain the accurate final synthetic radar heatmap; mixing the synthetic radar heatmap and the real radar heatmap and performing training and obtaining the target human body pose data based on the map2pose network of radar heatmap, so as to realize the accurate estimation of human body pose under a small amount of real radar data.

The disclosure has the following beneficial effects.

First, the radar heatmap synthesis method based on the physical optics method and the map2map network provided by the disclosure is capable of accurately generating the simulated radar heatmap of the human body target, and making up for the insufficient quantity problem of the current radar-based human body pose estimation data set.

Second, the map2pose network proposed by the disclosure realizes more accurate estimation of human body pose by extracting the spatio-temporal features of heatmap data, adaptive fusion and structural feature extraction based on graph convolution.

Third, compared with the traditional vision-based human body pose estimation method, the disclosure is based on radio frequency signals, and the work is not affected by unfavorable factors such as sight range and irradiation intensity, and may protect the privacy of users to a certain extent.

DETAILED DESCRIPTION OF THE EMBODIMENTS

The objective and effect of the present disclosure will become clearer when the present disclosure is described in detail according to the attached drawings and preferred embodiments. It should be understood that the specific embodiments described here are only for explaining the disclosure, and are not used to limit the disclosure.

Figure 1:
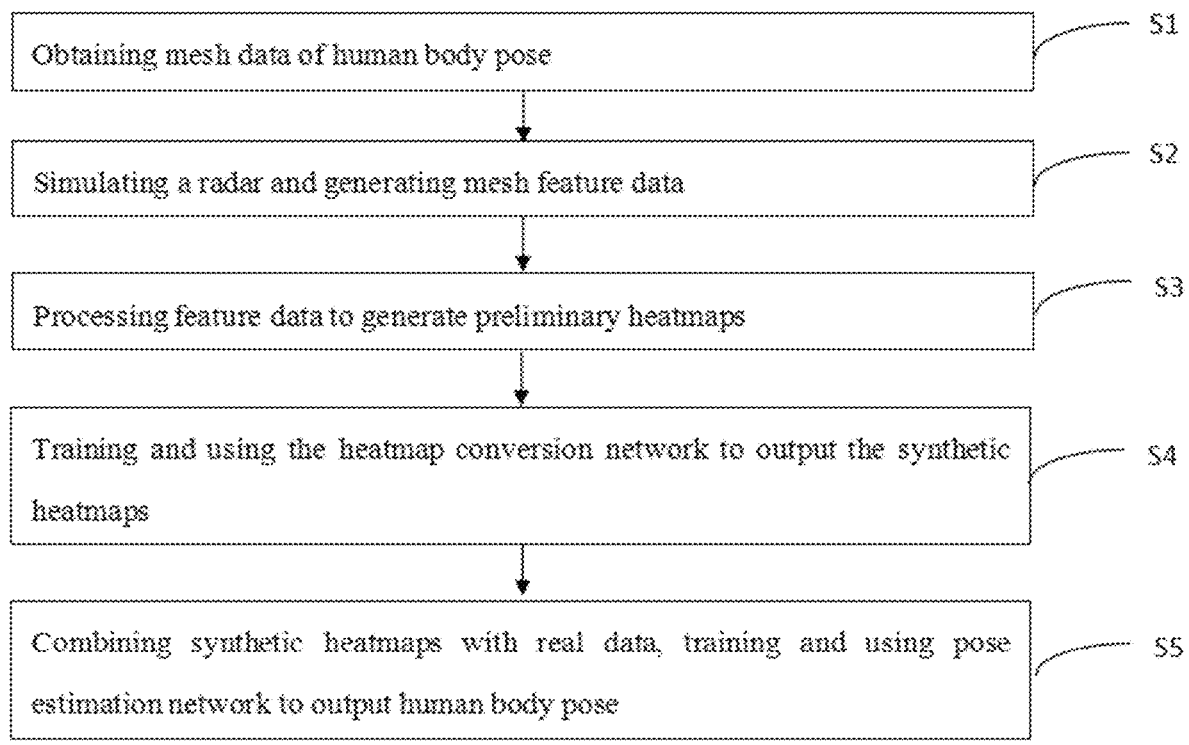
FIG. 1 is a schematic diagram of the overall structure of the system of the present disclosure.

As shown in FIG. 1, the human body pose estimation method based on radio frequency heatmap data enhancement includes the following steps:

Step S1, the sensor is used to obtain the mesh data of human body pose, which includes 6890 triangular facets. Each of the triangular facets is represented by three vertex coordinates in three-dimensional space and the corresponding normal vectors.

Figure 2:
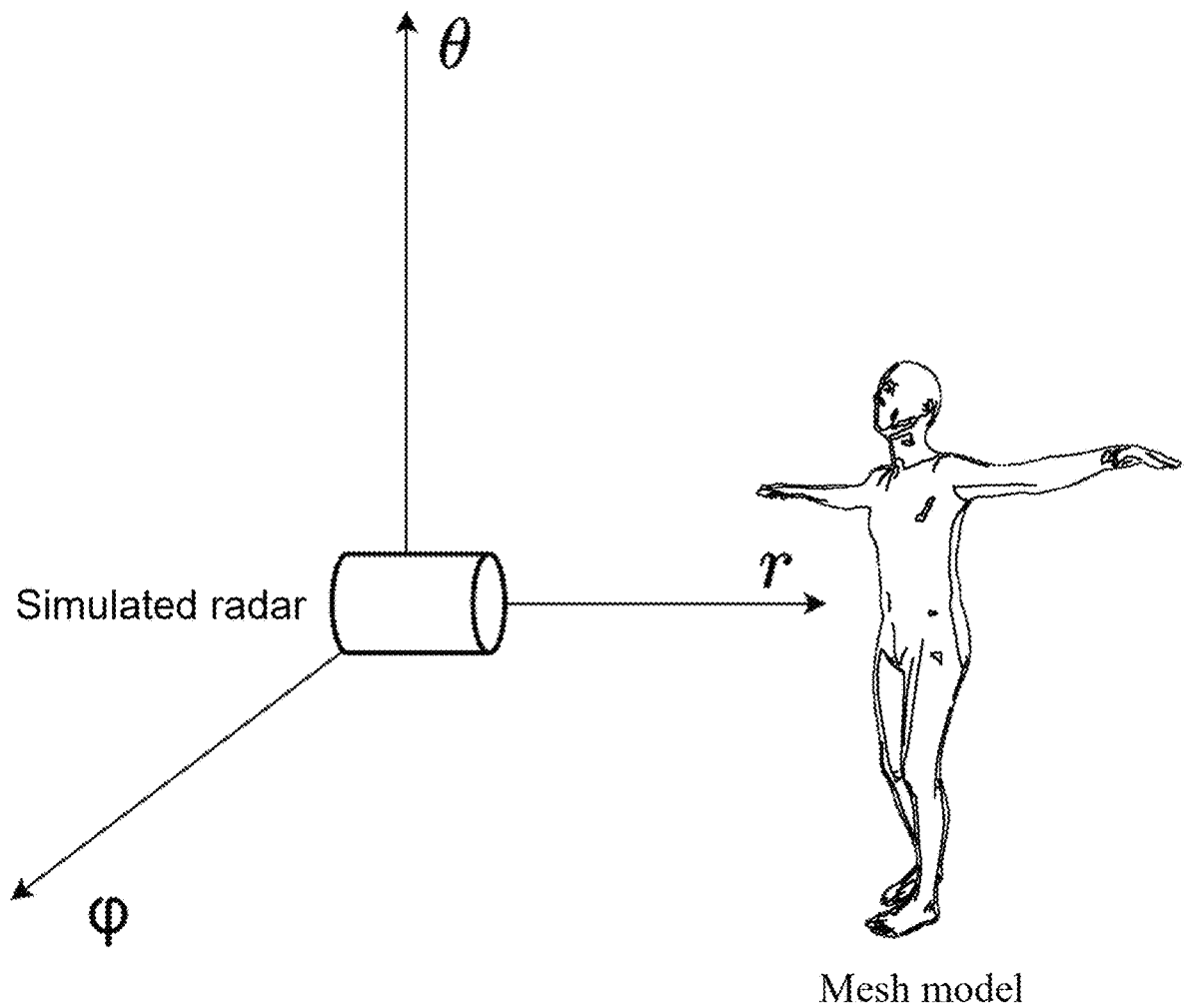
FIG. 2 is a schematic diagram of simulating radar position in step S2 of the present disclosure.

Step S2: the radar is simulated by the physical optics method, a human body mesh model is constructed from the mesh data of S1, and human body mesh features including radar cross section are obtained by irradiating the human body mesh model. Step S2 is realized by the following sub-steps:

S21, the plane wave $E^i$ emitted by radar is simulated and irradiate the target human body mesh model, as shown in FIG. 2. Specific parameters include: the transmission frequency is 81 GHZ; the incidence direction is the horizontal direction pointing to the human body mesh model; the antenna polarization mode is vertical polarization, and the observation angle is ±60 degrees in the horizontal direction and ±60 degrees in the vertical direction with the simulated radar position as the center. The target human body mesh model S includes 6,890 triangular facets. According to the physical optics method and a Stratton-Chu formula, a surface scattering field $E_n^s$ of one of the irradiated facets $S_n$ is defined as follows:

$$E_n^s = \frac{jk}{4\pi} \frac{e^{-jkr_n}}{r_n} \int_{S_n} (ZJ_{S_n} - s \times M_{S_n}) e^{jkr_n(i-s)} ds_n \tag{1}$$

where i and s are unit vectors of an incidence direction and an observation direction, respectively; $r_n$ is a position vector of a facets $S_n$, and $r_n$ is a range from the radar to a target facets $S_n$; k and Z are wave number and wave impedance in free space, respectively; $J_{S_n}$ and $M_{S_n}$ respectively represent surface current and surface magnetic current of the facets $S_n$; e is a natural constant and J is an imaginary unit.

S22, then the radar cross section (RCS) $\sigma_n$ of the facet at the observation point is:

$$\sigma_n = 4\pi R_n^2 \frac{|E_n^s|^2}{|E_n^i|^2} \tag{2}$$

where $E_n^i$ is the incident electric field of facet $S_n$; $R_n$ is the range from the facet $S_n$ to the observation point. The above calculation formula is repeated, and 6890 triangular facets in the human body mesh model S are calculated to obtain the human body mesh features including RCS.

S3, the human body mesh features including the radar cross section obtained in S2 are processed to obtain preliminary simulated radar heatmaps, including a range-azimuth heatmap, a range-elevation heatmap and a range-Doppler heatmap. Step S3 is realized by the following sub-steps:

S31, each of facets has a calculated radar cross section $\sigma_n$, and coordinates of the facets in a three-dimensional space are marked as:

$$S = \{a_i : i = 1, 2, 3, \ldots, N\} \tag{3}$$

where $a_i = (x_i, y_i, z_i)$ are coordinates of a centroid of each of the triangular facets in three-dimensional Cartesian space.

S32, a position of each of the facets of the mesh model is converted into a radar spherical coordinate system, and conversion formulas are:

$$\begin{cases} r_i = \sqrt{x_i^2 + y_i^2 + z_i^2} \\ \theta_i = \arccos\left(\frac{z_i}{r_i}\right) \\ \varphi_i = \arctan\left(\frac{y_i}{x_i}\right) \end{cases} \tag{4}$$

where $b_i = (r_i, \theta_i, \varphi_i)$ are coordinates in radar space and $r_i$ is a radial range of the facets from the radar; $\theta_i$ is an elevation of radar; $\varphi_i$ is an azimuth of the radar.

S33, a whole radar space is dispersed into a plurality of angle bins corresponding to each of pixels of a heatmap; a resolution of the heatmap is set to be Q×Q, Q=32, and the corresponding spatial information of each of the pixels is:

$$\begin{cases} \Delta\theta = \frac{\theta_{max} - \theta_{min}}{Q} \\ \Delta\varphi = \frac{\varphi_{max} - \varphi_{min}}{Q} \\ \Delta r = \frac{r_{max} - r_{min}}{Q} \\ \Delta v = \frac{v_{max} - v_{min}}{Q} \end{cases} \tag{5}$$

where $\Delta\theta$ is the elevation, $\Delta\varphi$ is the azimuth, $\Delta r$ is the range, $\Delta v$ is the velocity, and $\theta_{max}=60°$ and $\theta_{min}=-60°$ are the set maximum and minimum values of the elevation; $\varphi_{max}=60°$ and $\varphi_{min}=-60°$ are the maximum and minimum values of the azimuth; $r_{max}=5.5$m and $r_{min}=1.5$m are the maximum and minimum values of the range; $v_{max}=3$ m/s and $v_{min}=-3$ m/s are the set maximum and minimum values of the velocity.

For range-azimuth heatmaps, each pixel (m, n) corresponds to $(r_m, \varphi_n)$, and signal intensity of all the facets at the angle is accumulated as follows:

$$P_{ra}(m, n) = \sum_{i=1}^{N} \sigma_i I\left(r_m - \frac{\Delta r}{2} \leq r_i \leq r_m + \frac{\Delta r}{2}\right) \cdot I\left(\varphi_n - \frac{\Delta\varphi}{2} \leq \varphi_i \leq \varphi_n + \frac{\Delta\varphi}{2}\right) \tag{6}$$

where I( ) is an indicator function, which is used to judge whether the facets are within the angular range of the current pixel.

Similarly, the range-elevation heatmap may be calculated as follows:

$$P_{re}(m, n) = \sum_{i=1}^{N} \sigma_i I\left(r_m - \frac{\Delta r}{2} \leq r_i \leq r_m + \frac{\Delta r}{2}\right) \cdot I\left(\theta_n - \frac{\Delta\theta}{2} \leq \theta_i \leq \theta_n + \frac{\Delta\theta}{2}\right) \tag{7}$$

For the range-Doppler heatmap, a change of a radial range r for centroid $b_i$ of facets i moving from time $t_1$ to time $t_2$ is defined as $\Delta r_{b_i}$, and the velocity of $$b_i \text{ is } v_i = \frac{\Delta r_{b_i}}{t_2 - t_1}$$

then the range-Doppler heatmap is calculated as follows:

$$P_{rd}(m, n) = \sum_{i=1}^{N} \sigma_i I\left(r_m - \frac{\Delta r}{2} \leq r_i \leq r_m + \frac{\Delta r}{2}\right) \cdot I\left(v_n - \frac{\Delta v}{2} \leq v_i \leq v_n + \frac{\Delta v}{2}\right) \tag{8}$$

Step S4, the U-net-based heatmap conversion network (map2map) is trained and used to process the preliminary simulated radar heat map obtained in S3, the scattering and environmental noise which are difficult to be simulated by the PO method are supplemented, and the final synthetic radar heatmap is output. Step S4 is realized by the following sub-steps:

S41, the three preliminary heatmaps obtained in S3, namely, range-azimuth heatmap, range-elevation heatmap and range-Doppler heatmap, are superimposed in the channel dimension to obtain the input feature data $map_{coarse}$ with the shape of (3,32,32).

Figure 3:
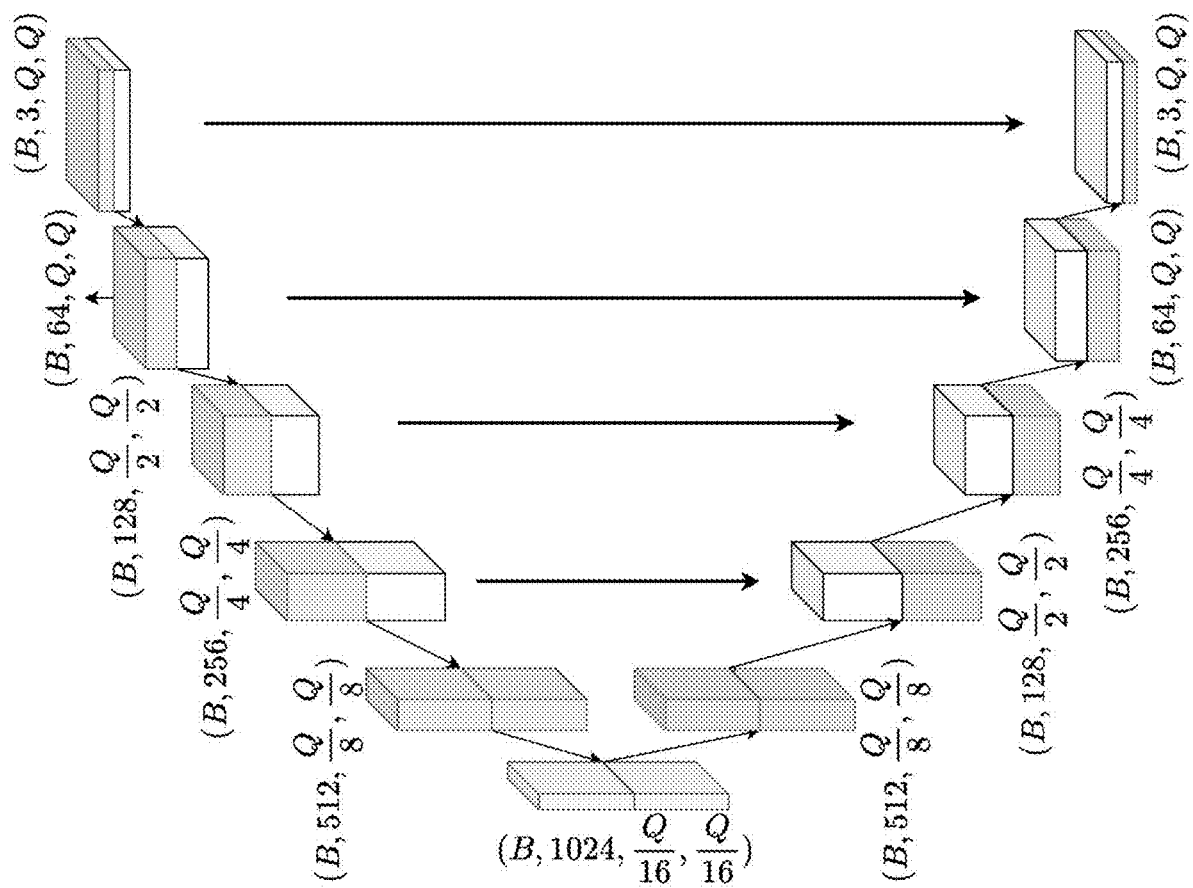
FIG. 3 is a schematic diagram of the map2map network structure in step S2 of the present disclosure.

S42, a map2map network based on U-net is constructed, the structure is shown in FIG. 3. $map_{coarse}$ is input into this network to obtain the output $map_{fine}$ with the shape of (3,32,32). The map2map network includes an encoder and a decoder:

$$F_0 = \text{Encoder}(map_{coarse}, \theta^e) \quad (9)$$

$$map_{fine} = \text{Decoder}(F_0, \theta^d) \quad (10)$$

where $F_0$ is the intermediate feature; $\theta^e$ and $\theta^d$ are learnable parameters of network module.

S43, map2map network based on U-net is trained, and Adam optimizer is used to minimize the mean square error loss between $map_{coarse}$ and $map_{fine}$. The results are shown in FIG. 5A-FIG. 5I; map2map network is capable of accurately generating radar heatmap.

Further, the step S41 is realized by the following sub-steps:

S411, Encoder includes five layers of two-dimensional convolution (Conv2d), and the convolution kernel size of each layer of two-dimensional convolution is 3×3, and the padding is 1; the channel dimensions of the heatmaps in each layer of two-dimensional convolution are: 3, 64, 128, 256, 512, 1024; the width and high dimensions of the heatmaps are: 32, 32, 16, 8, 4, 2; and each layer uses two-dimensional maximum pooling (MaxPool2d) and two-dimensional batch normalization (BatchNorm2d), and the activation function is ReLU. The shape of the obtained intermediate feature $F_0$ is (1024,2,2).

S412, Decoder includes five layers of two-dimensional deconvolution (ConvTranspose2d), and the convolution kernel size of each layer of two-dimensional deconvolution is 2, the stride is 2, and the channel dimensions of heatmap in each layer of two-dimensional deconvolution are: 1024, 512, 256, 128, 64, 3; the width and high dimensions of heatmap are: 2, 4, 8, 16, 32, 32; and each layer uses two-dimensional batch normalization (BatchNorm2d), and the activation function is ReLU. The final network output $map_{fine}$ is in the shape of (3,32,32).

Figure 4:
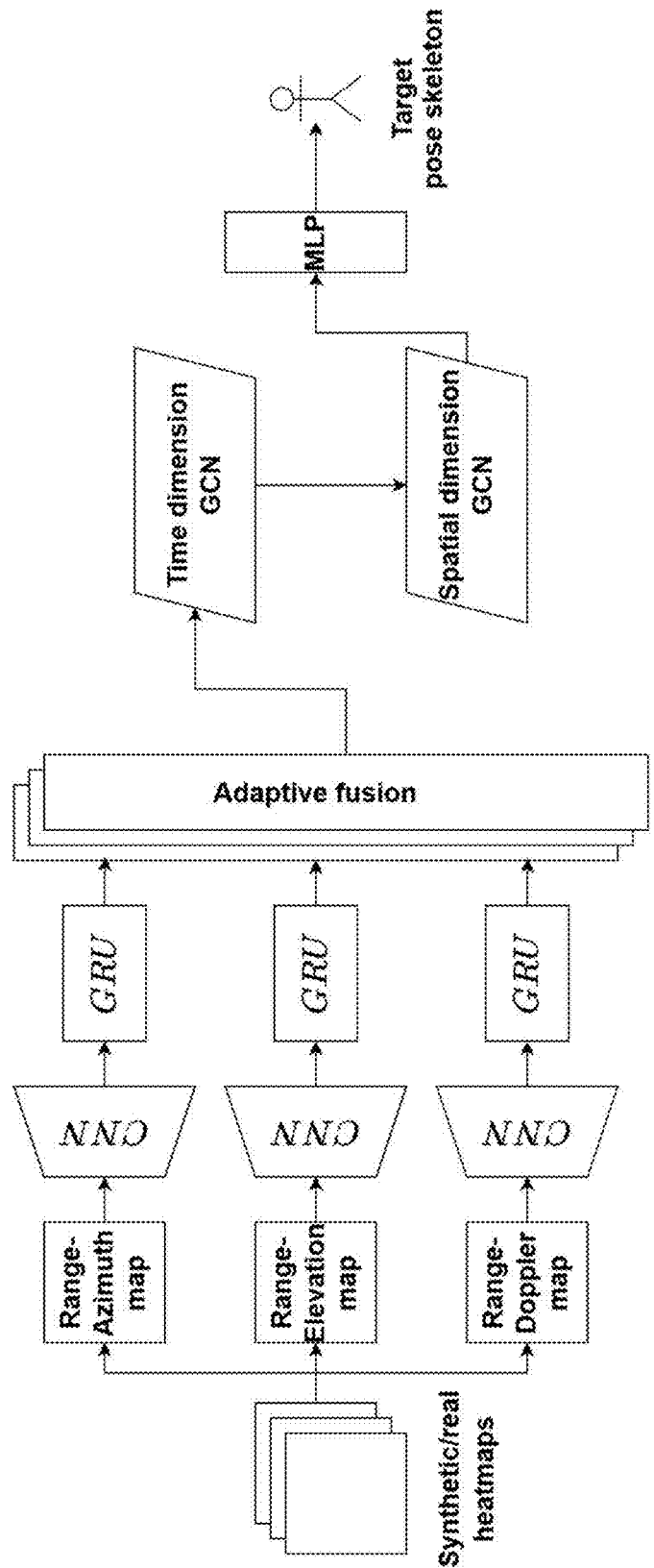
FIG. 4 is a schematic diagram of the map2pose network structure in step S3 of the present disclosure.
Figure 5A:
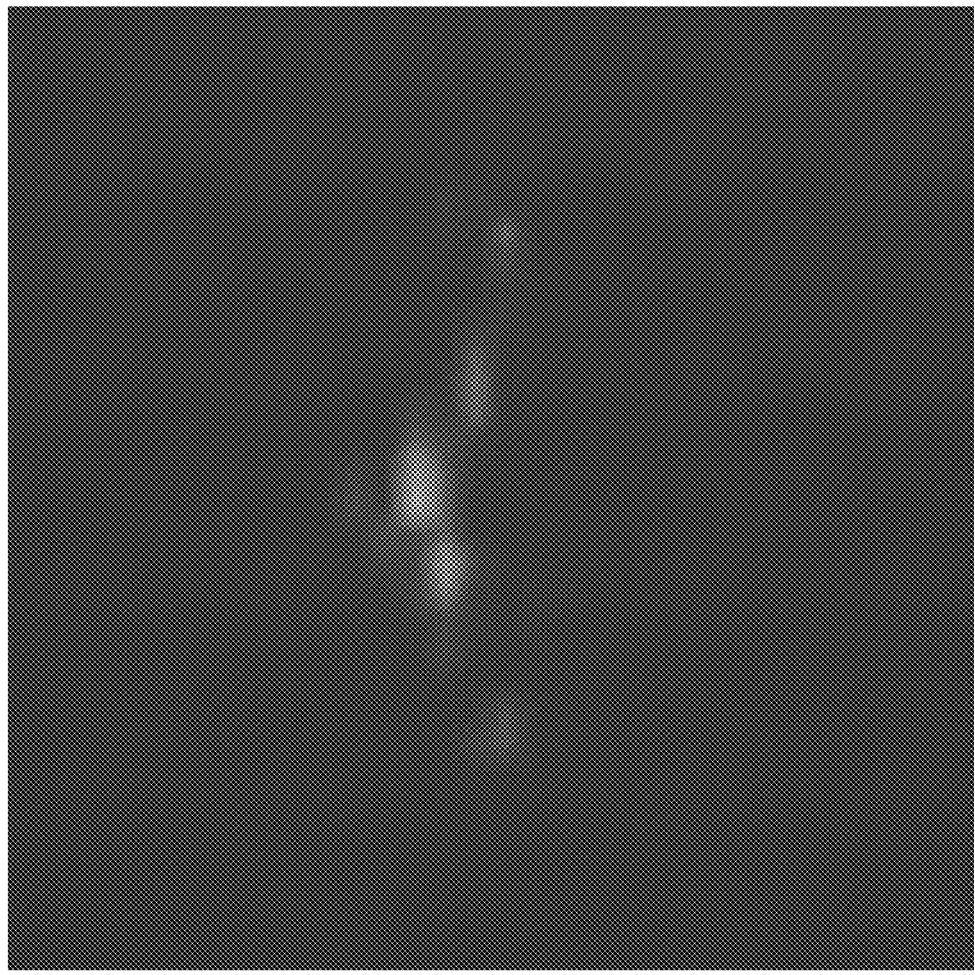
FIG. 5A is the preliminary synthetic heatmap of range-azimuth as the experimental result of map2map network in step S2 of the present disclosure.
Figure 5B:
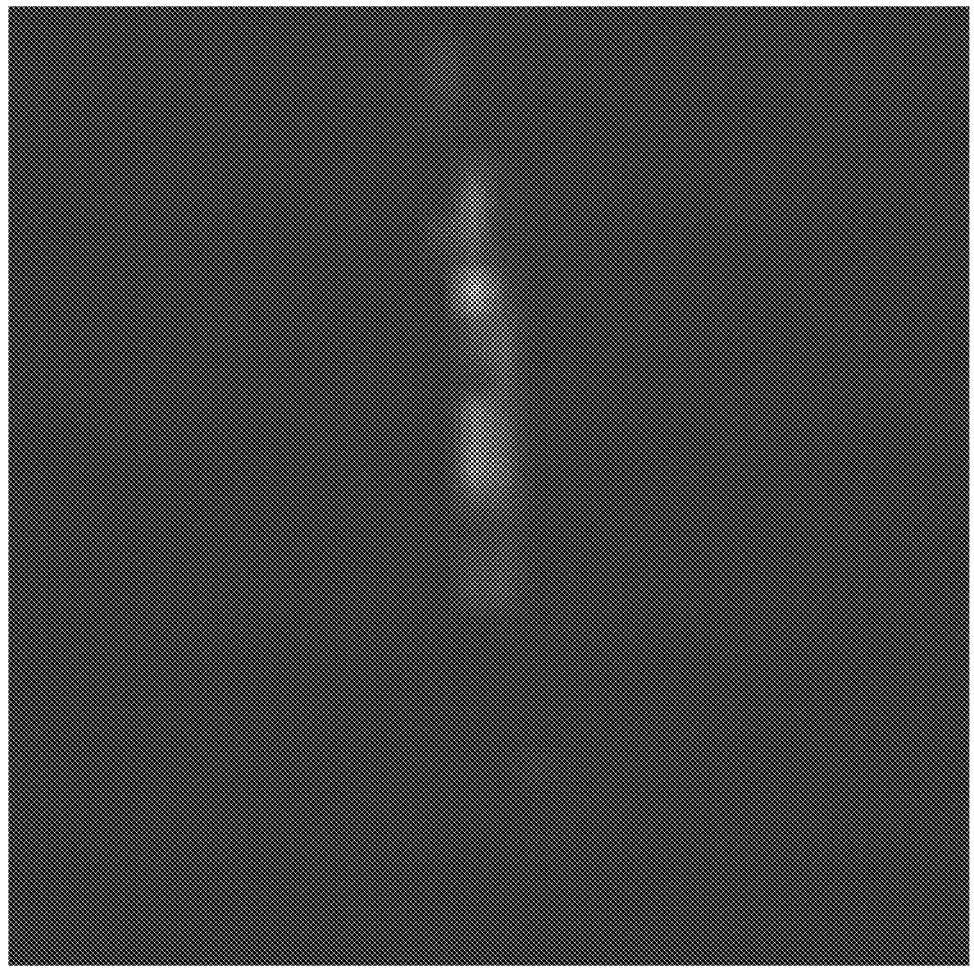
FIG. 5B is the preliminary synthetic heatmap of range-elevation as the experimental result of map2map network in step S2 of the present disclosure.
Figure 5C:
FIG. 5C is the preliminary synthetic heatmap of range-Doppler as the experimental result of map2map network in step S2 of the present disclosure.
Figure 5D:
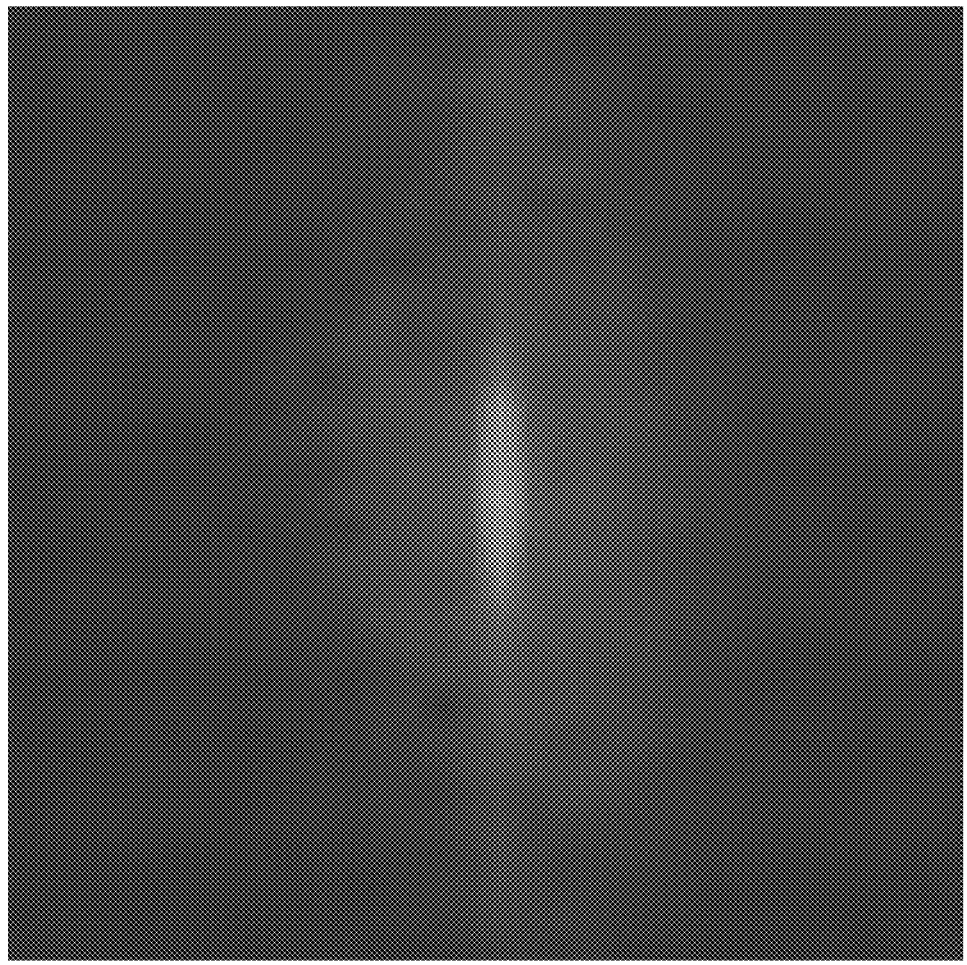
FIG. 5D is the final synthetic heatmap of range-azimuth as experimental result of map2map network in step S2 of the present disclosure.
Figure 5E:
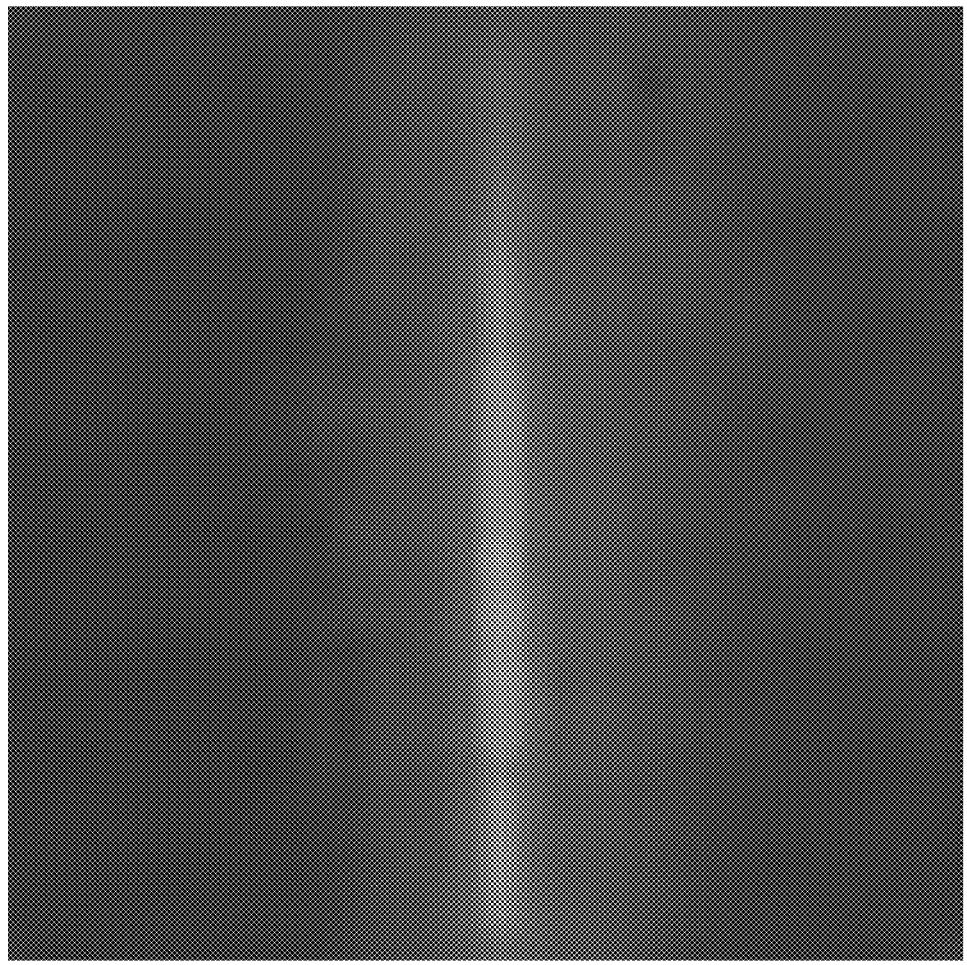
FIG. 5E is the final synthetic heatmap of range-elevation as experimental result of map2map network in step S2 of the present disclosure.
Figure 5F:
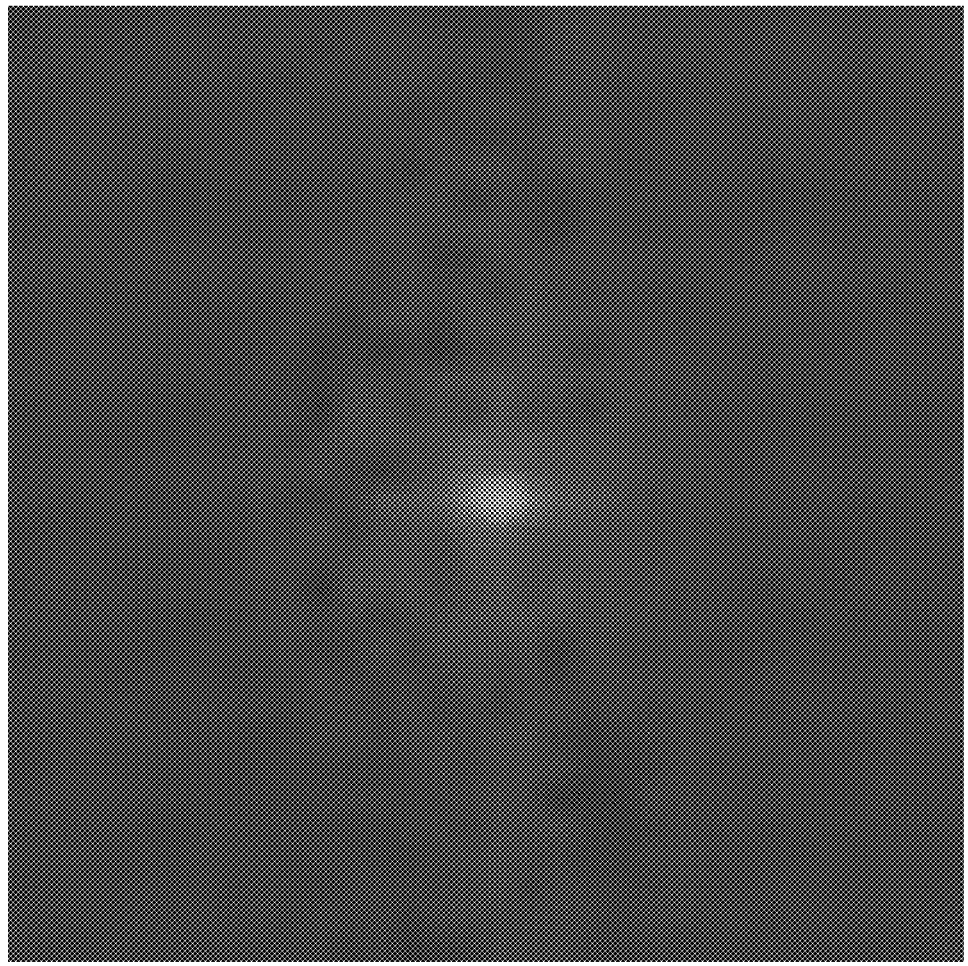
FIG. 5F is the final synthetic heatmap of range-Doppler as the experimental result of map2map network in step S2 of the present disclosure.
Figure 5G:
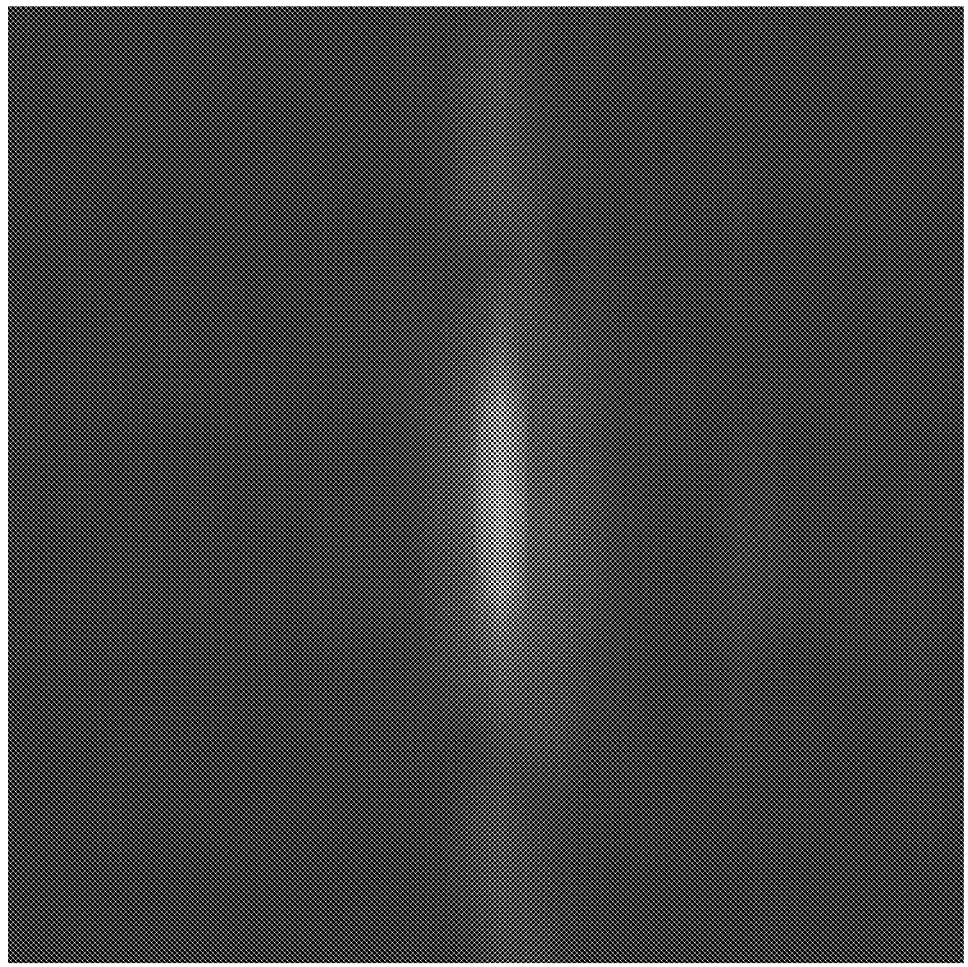
FIG. 5G is the real radar heatmap of range-azimuth as the experimental result of map2map network in step S2 of the present disclosure.
Figure 5H:
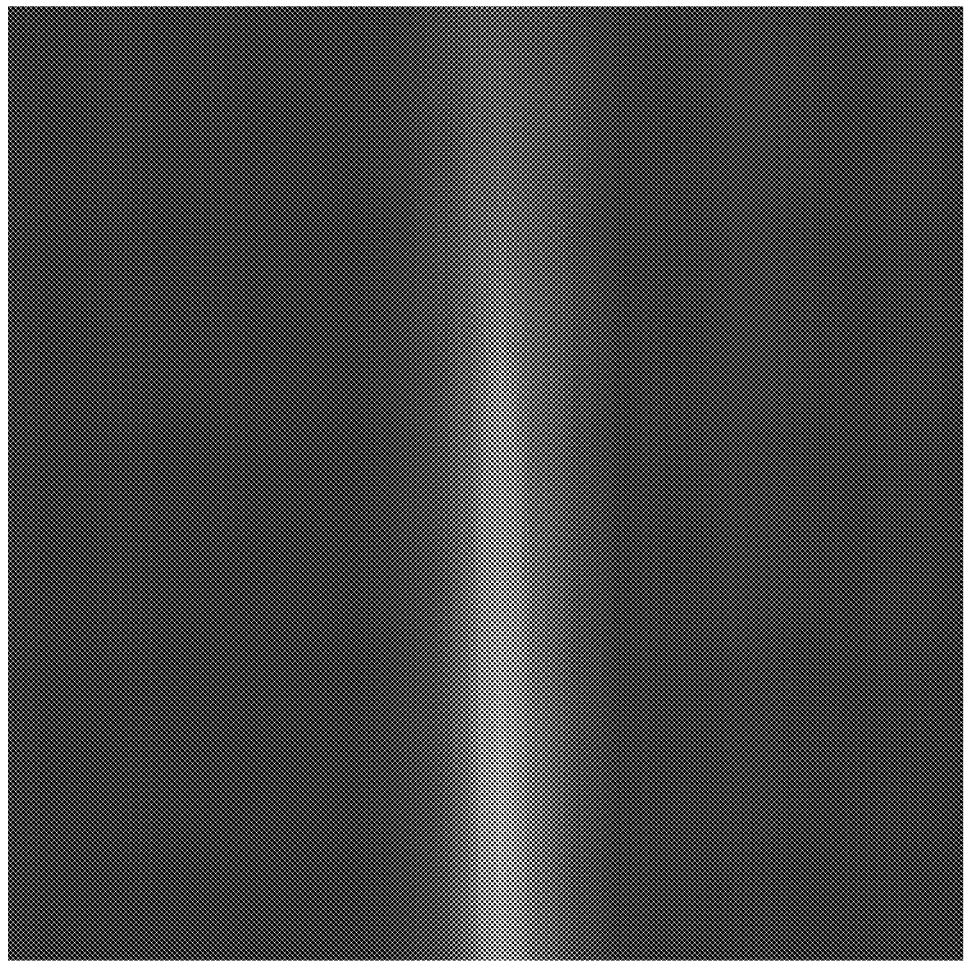
FIG. 5H is the real radar heatmap of range-elevation as the experimental result of map2map network in step S2 of the present disclosure.
Figure 5I:
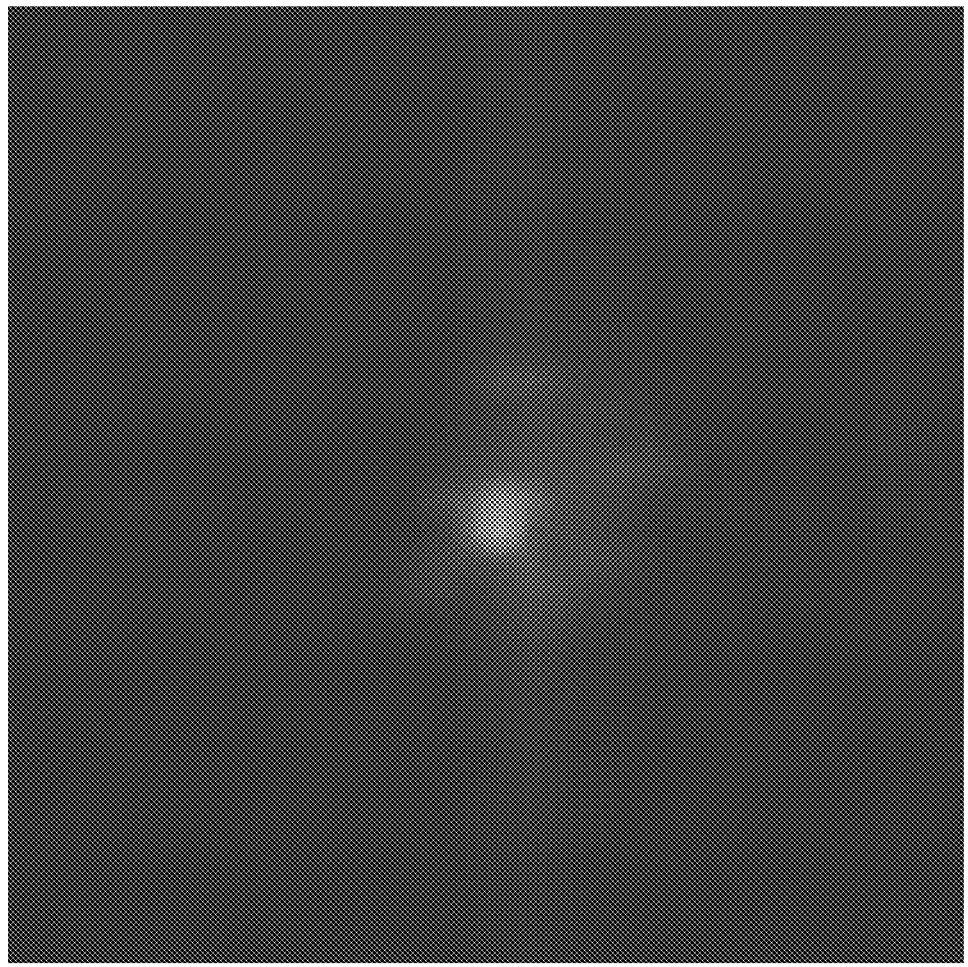
FIG. 5I is the real radar heatmap of range-Doppler as the experimental result of map2map network in step S2 of the present disclosure.
Figure 6A:
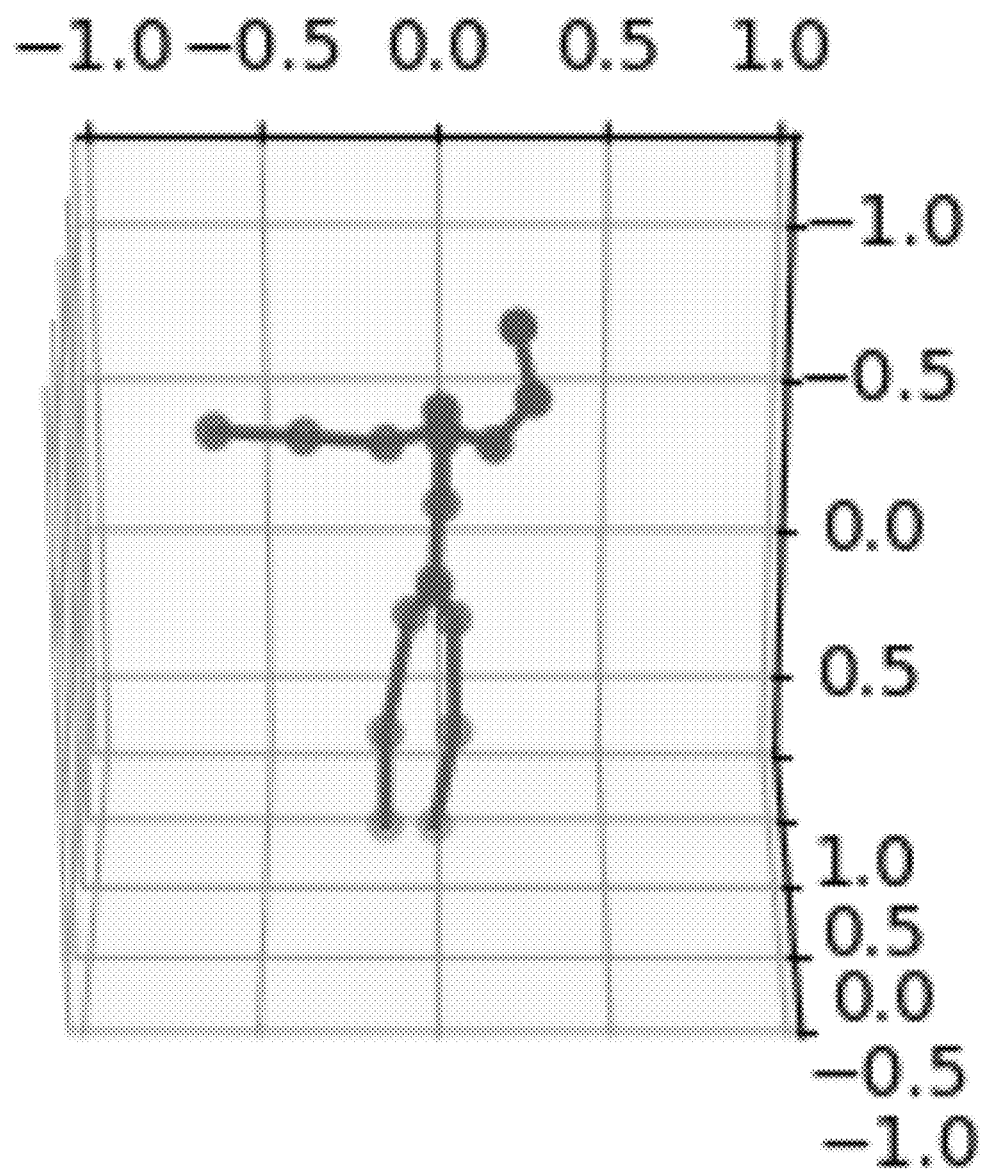
FIG. 6A is a map2pose network experiment result diagram of real pose 1 in step S3 of the present disclosure.
Figure 6B:
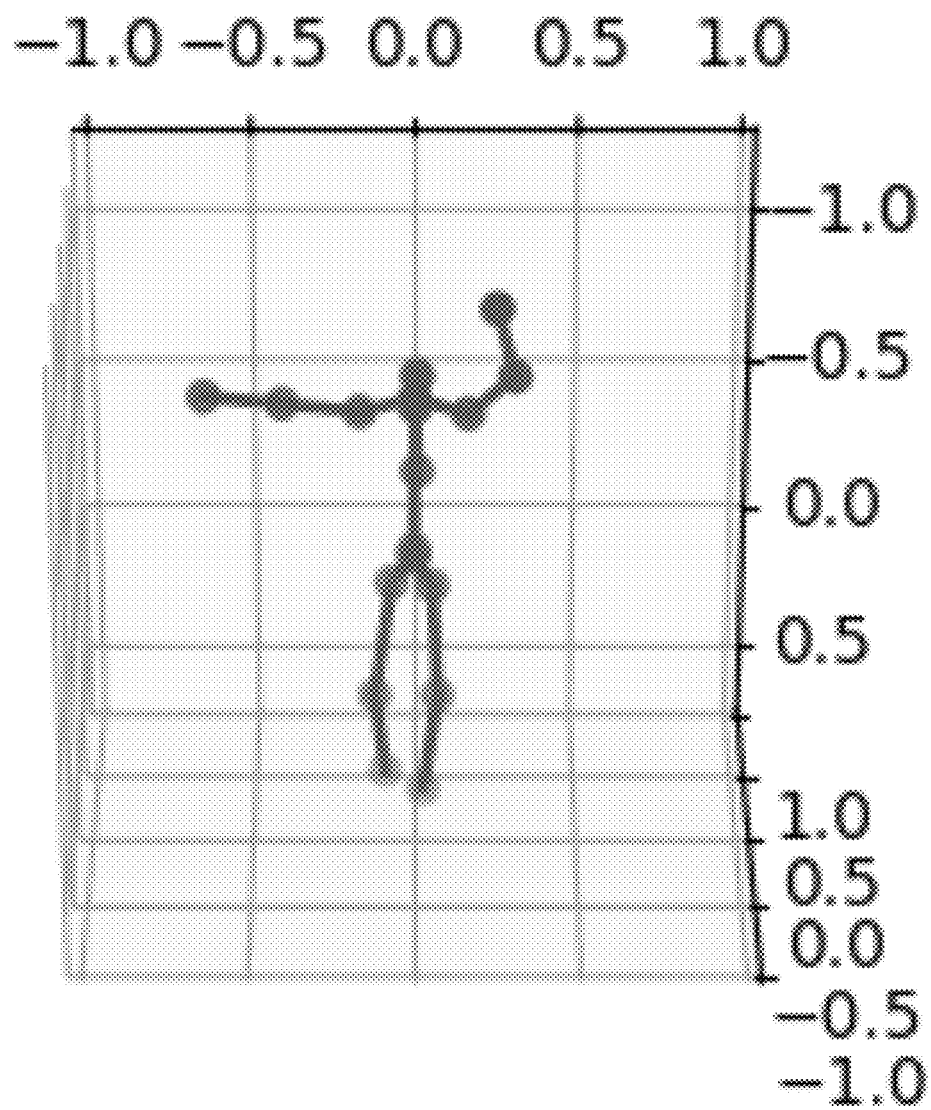
FIG. 6B is a map2pose network experiment result diagram of estimated pose 1 in step S3 of the present disclosure.
Figure 6C:
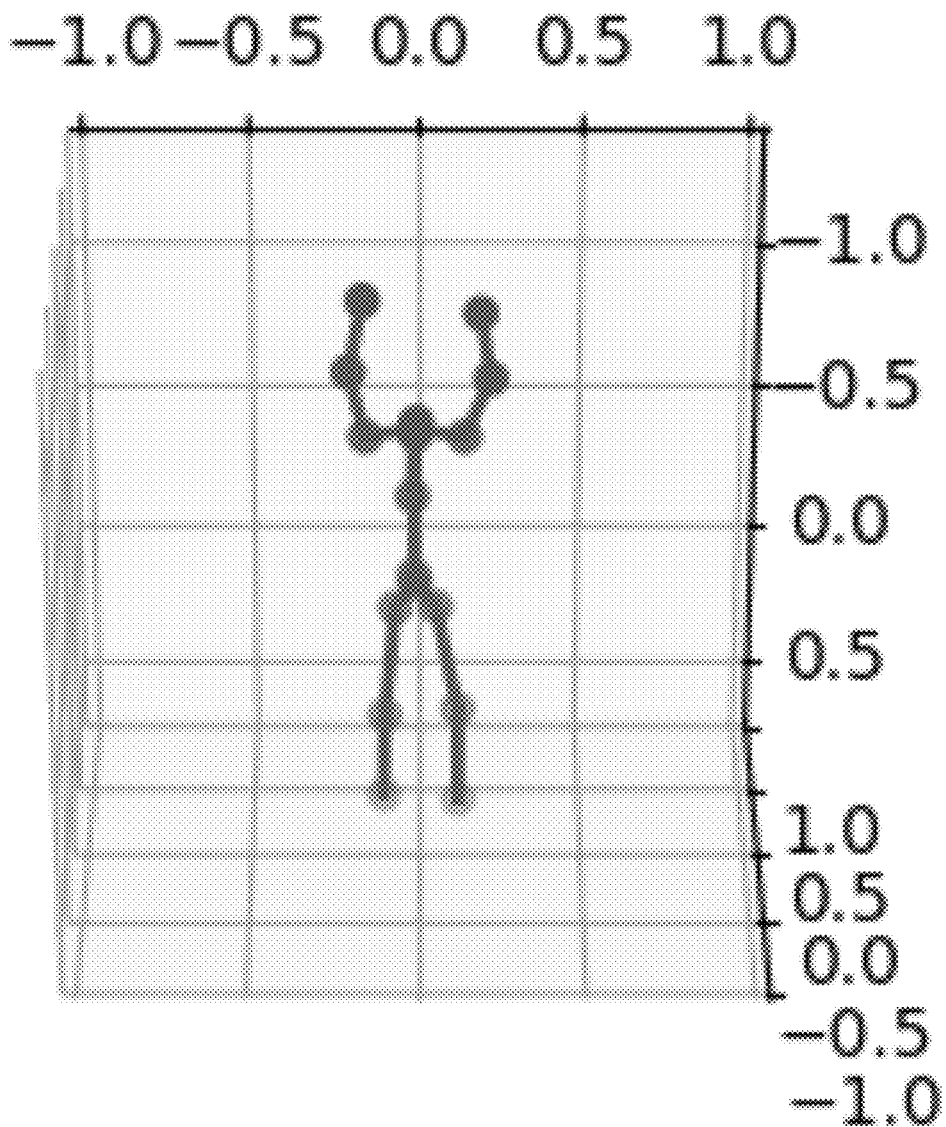
FIG. 6C is a map2pose network experiment result diagram of real pose 2 in step S3 of the present disclosure.
Figure 6D:
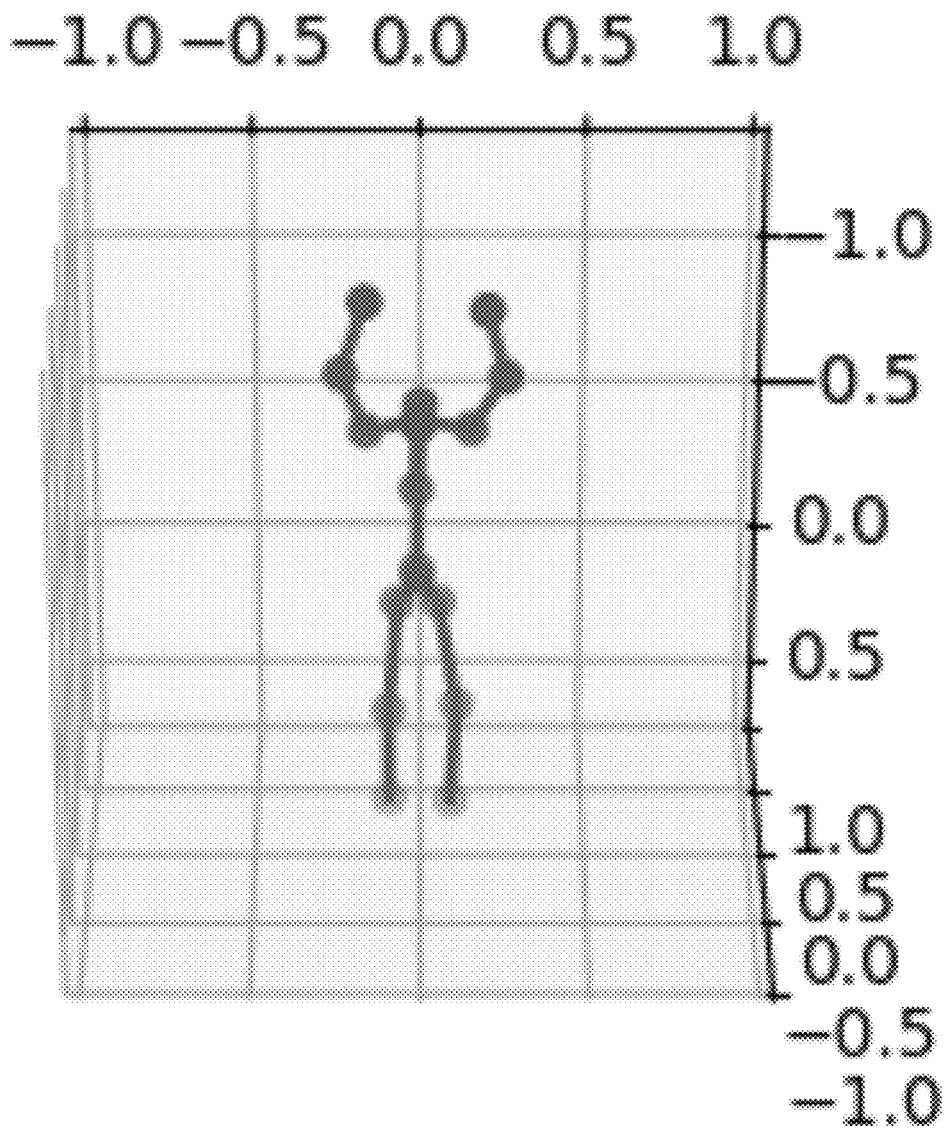
FIG. 6D is a map2pose network experiment result diagram of estimated pose 2 in step S3 of the present disclosure.
Figure 6E:
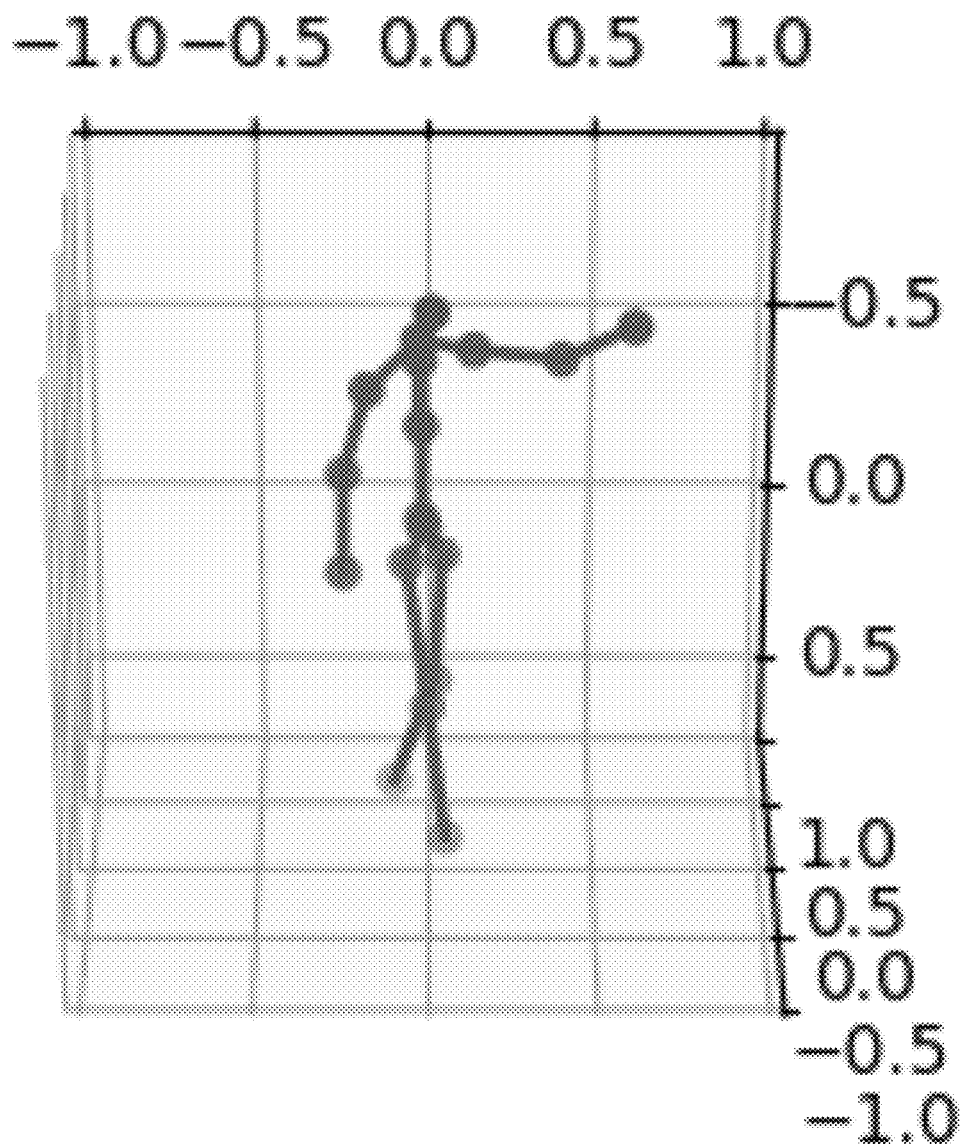
FIG. 6E is a map2pose network experiment result diagram of real pose 3 in step S3 of the present disclosure.
Figure 6F:
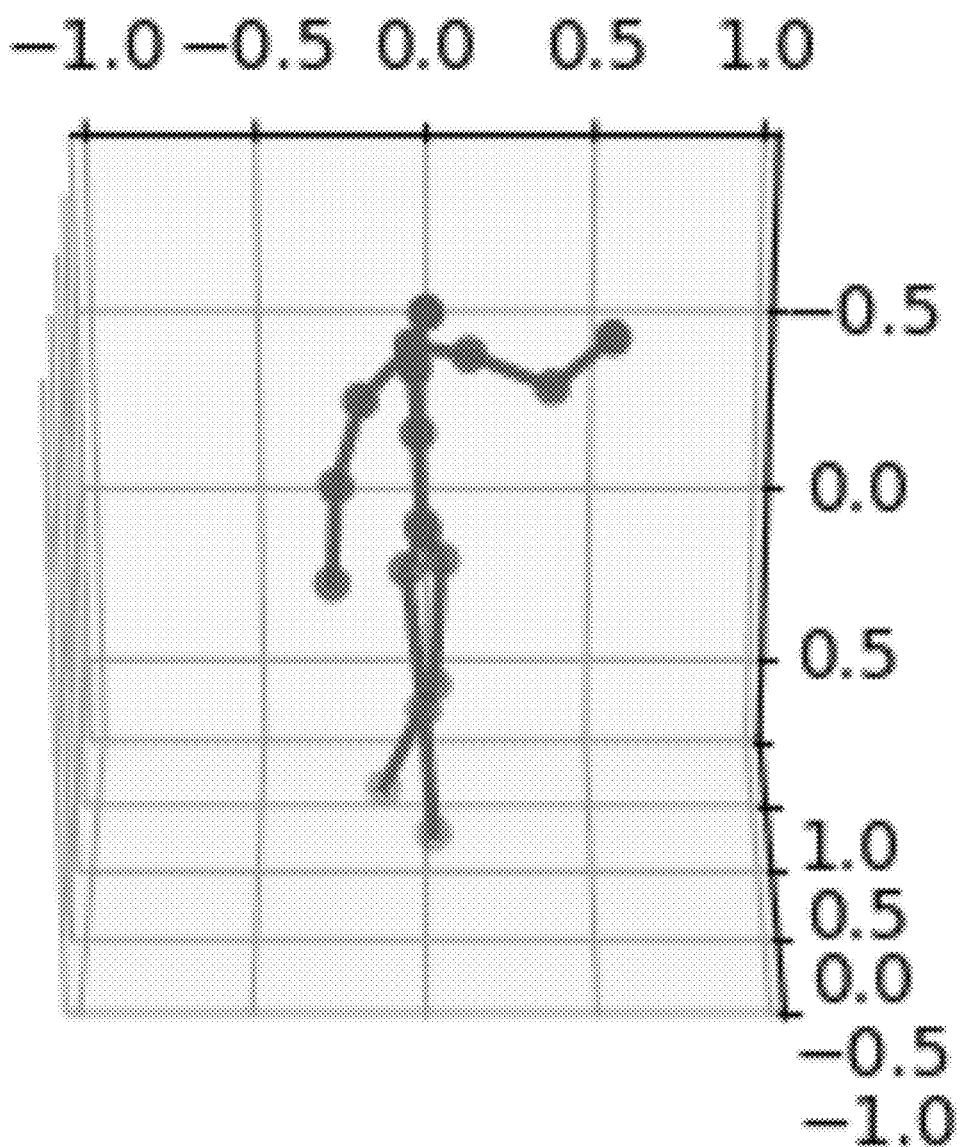
FIG. 6F is a map2pose network experiment result diagram of estimated pose 3 in step S3 of the present disclosure.

Step S5, the synthetic radar heatmap data obtained in S4 is combined with the real radar data to construct a mixed data set, and a human body pose estimation network (map2pose) based on radar heatmap is trained and used with the structure shown in FIG. 4 to obtain a high-precision human body pose skeleton. Step S5 is realized by the following sub-steps:

S51, for the input features $map_i$, $i \in \{ra, re, rd\}$, $CNN_i$ is first input, $i \in \{ra, re, rd\}$, and $CNN_i$ is composed of multiple convolution layers. For each layer convolution, the first dimension of the input heatmap features increases, and the second and third dimensions decrease; and each layer uses two-dimensional batch normalization, and the activation function is ReLU. This layer is used to extract multi-scale spatial features in the heatmap, and the output is $F_{1,i}$.

S52, $F_{1,i}$, $i \in \{ra, re, rd\}$ is input into $GRU_i$, $i \in \{ra, re, rd\}$ composed of multi-layer gated recurrent units to capture the time-dependent features in the sequence data, and the output is $F_{2,i}$.

S53, $F_{2,i}$, $i \in \{ra,re,rd\}$ is input into AdaptiveFusion, and adaptive fusion is performed on the input features, and the output is $F_3$, where AdaptiveFusion D is defined as follows:

$$F_3 = \alpha_{ra} \circ F_{2,ra} + \alpha_{re} \circ F_{2,re} + \alpha_{rd} \circ F_{2,rd} \quad (11)$$

$$\alpha_i = \text{Softmax}(W_i \cdot \text{Concat}(F_{2,ra}, F_{2,re}, F_{2,rd})), i \in \{ra, re, rd\} \quad (12)$$

where $\circ$ is the element multiplication, Softmax( ) is the normalized exponential function, and $W_i$ is the learnable parameter.

S54, $F_3$ is input into the graph convolutional networks $GCN_{temporal}$ and $GCN_{spatial}$ to extract the spatio-temporal features of graph dimensions;

$$F_4 = GCN_{temporal}(F_3, \theta^{gt}) \quad (13)$$

$$F_5 = \text{Reshape}(F_4) \quad (14)$$

$$F_6 = GCN_{spatial}(F_5, \theta^{gs}) \quad (15)$$

where $F_3 \in \mathbb{R}^{B \times J \times T \times C}$, B is a batch size, I is a number of joint points, T is a time dimension size, and C is a channel dimension size; Reshape is a feature shape adjustment, the specific way is: linearly expanding $F_4 \in \mathbb{R}^{B \times J \times T \times C}$ into a one-dimensional sequence, and then performing arrangement and combination again according to a target shape (B×T×J×C) to obtain $F_5 \in \mathbb{R}^{B \times J \times T \times C}$. $GCN_i$, $i \in \{temporal, spatial\}$ is defined as follows:

$$H^{(l+1)} = \sigma\left(\tilde{D}^{-\frac{1}{2}} \tilde{A} \tilde{D}^{-\frac{1}{2}} H^{(l)} W^{(l)}\right) \quad (16)$$

where $\tilde{A} = A + I_N$, A is an adjacent matrix of the predefined undigraph G of human body joints, when $I_N$ is an identity matrix, $\tilde{D}$ is the degree matrix of $\tilde{A}$, $\tilde{A}$ is the l-layer learnable parameter, $\sigma(\cdot)$ is the activation function, $H^{(l)}$ is the l-layer input, and $H^{(l+1)}$ is the l-layer output. After multi-layer graph convolution, the output is $F_6$.

S55, $F_5$ is input into MLP including multiple linear layers to obtain the final human body pose $F_{pose}$.

S56, map2pose network is trained, and Adam optimizer is used to minimize the average absolute error loss between the label value and the network predicted value. Results as shown in FIG. 6A-FIG. 6F, map2pose network is capable of accurately estimating the target human body pose.

The pose $F^{pose}$ includes 18 human body joint points, and each joint point is represented by three-dimensional space coordinates. As shown in FIG. 6A-FIG. 6F, map2pose network is capable of accurately estimating the three-dimensional pose of the target human body under the condition of using 80% synthetic radar heatmap data and 20% real radar heatmap data.

The human body pose estimation method based on radio frequency heatmap data enhancement provided by the disclosure has higher precision and stability. Using PO method to simulate synthetic radar data may accurately and robustly estimate the target human body pose with less real radar data. In addition, the disclosure can be applied to the fields of human-computer interaction, medical care and the like, and has good practicability and wide application prospect.

It can be understood by those skilled in the art that the above is only a preferred example of the disclosure, and it is not used to limit the disclosure. Although the disclosure has been described in detail with reference to the above examples, it is still possible for those skilled in the art to modify the technical scheme described in the above examples or replace some technical features equally. Any modification and equivalent substitution within the spirit and principle of the disclosure should be included in the scope of protection of the disclosure.

What is claimed is:

1. A human body pose estimation method based on radio frequency heatmap data enhancement, comprising following steps:

step S1, obtaining mesh data of human body pose by using a sensor;

step S2, simulating a radar by using a physical optics method, constructing a human body mesh model based on the mesh data, and irradiating the human body mesh model to obtain human body mesh features comprising a radar cross section; a specific implementation process is as follows:

S21, simulating a plane wave $E^i$ emitted by the radar, and irradiating a target human body mesh model; supposing that the target human body mesh model S comprises N triangular facets, and according to the physical optics method and a Stratton-Chu formula, a surface scattering field $E_n^s$ of one of the irradiated facets $S_n$ is defined as follows $$E_n^s = \frac{jk}{4\pi} \frac{e^{-jkr_n}}{r_n} \int_{s_n} (ZJ_{s_n} - s \times M_{s_n}) e^{jkr_n \cdot (i-s)} ds_n \quad (1)$$

wherein i and S are unit vectors of an incidence direction and an observation direction, respectively; $r_n$ is a position vector of a facet $S_n$, and $r_n$ is a range from the radar to a target facet $S_n$; k and Z are wave number and wave impedance in free space, respectively; $J_{s_n}$ and $M_{s_n}$ respectively represent surface current and surface magnetic current of the facet $S_n$; e is a natural constant and j is an imaginary unit;

S22, then a value $\sigma_n$ of the radar cross section (RCS) of the facet $S_n$ at an observation point:

$$\sigma_n = 4\pi R_n^2 \frac{|E_n^s|^2}{|E_n^i|^2} \quad (2)$$

wherein $E_n^i$ is an incident electric field of the facet $S_n$; $R_n$ is a range from the facet $S_n$ to the observation point;

repeating an above calculation method, and calculating N triangular facets in the human body mesh model S to obtain human body mesh features comprising the RCS;

step S3, processing the human body mesh features comprising the radar cross section to obtain preliminary simulated radar heatmaps;

step S4, inputting the preliminary simulated radar heatmaps into a heatmap conversion network map2map based on U-net, outputting synthetic radar heatmaps, and performing training; and step S5, combining the synthetic radar heatmaps with real radar heatmaps to construct a mixed data set, obtaining a human body pose skeleton through a human body pose estimation network map2pose based on the radar heatmaps, and performing training to complete the human body pose estimation.

2. The human body pose estimation method based on the radio frequency heatmap data enhancement according to claim 1, wherein a specific implementation process of the step S3 is as follows:

S31, each of facets has a calculated radar cross section $\sigma_n$, and coordinates of the facets in a three-dimensional space are marked as:

$$S = \{a_i; i=1,2,3,\ldots,N\} \quad (3)$$

wherein $a_i=(x_i, y_i, z_i)$ are coordinates of a centroid of each of the triangular facets in three-dimensional Cartesian space;

S32, converting a position of each of the facets of the mesh model into a radar spherical coordinate system, and conversion formulas are:

$$\begin{cases} r_i = \sqrt{x_i^2 + y_i^2 + z_i^2} \\ \theta_i = \arccos\left(\frac{z_i}{r_i}\right) \\ \varphi_i = \arctan\left(\frac{y_i}{x_i}\right) \end{cases} \quad (4)$$

wherein $b_i=(r_i, \theta_i, \theta_i)$ are coordinates in radar space and $r_i$ is a radial range of the facets from the radar; $\theta_i$ is the elevation of radar; $\varphi_i$ is the azimuth of the radar;

S33, dispersing a whole radar space into a plurality of angle bins corresponding to each of pixels of a heatmap; setting a resolution of the heatmap to be Q×Q, and spatial information corresponding to each of the pixels is:

$$\begin{cases} \Delta\theta = \frac{\theta_{max} - \theta_{min}}{Q} \\ \Delta\varphi = \frac{\varphi_{max} - \varphi_{min}}{Q} \\ \Delta r = \frac{r_{max} - r_{min}}{Q} \\ \Delta v = \frac{v_{max} - v_{min}}{Q} \end{cases} \quad (5)$$

wherein $\Delta\theta$ is the elevation, $\Delta\varphi$ is the azimuth, $A_r$ is the range, $\Delta v$ is the velocity, and $\theta_{max}$ and $\theta_{min}$ are a maximum value and a minimum value of the elevation; $\varphi_{max}$ and $\varphi_{min}$ are a maximum value and a minimum value of the azimuth; $r_{max}$ and $r_{min}$ are a maximum value and a minimum value of the range; and $v_{max}$ and $v_{min}$ are a maximum value and a minimum value of the velocity;

for range-azimuth heatmaps, each pixel (m, n) corresponds to $(r_m, \varphi_n)$, and signal intensity of all the facets at the angle is accumulated as follows:

$$P_{ra}(m, n) = \sum_{i=1}^{N} \sigma_i I\left(r_m - \frac{\Delta r}{2} \le r_i \le r_m + \frac{\Delta r}{2}\right) \cdot I\left(\varphi_n - \frac{\Delta\varphi}{2} \le \varphi_i \le \varphi_n + \frac{\Delta\varphi}{2}\right) \quad (6)$$

wherein I( ) is an indicator function, used to judge whether the facets are within an angular range of a current pixel; similarly, a range-elevation heatmap is calculated as follows:

$$P_{re}(m, n) = \sum_{i=1}^{N} \sigma_i I\left(r_m - \frac{\Delta r}{2} \le r_i \le r_m + \frac{\Delta r}{2}\right) \cdot I\left(\theta_n - \frac{\Delta\theta}{2} \le \theta_i \le \theta_n + \frac{\Delta\theta}{2}\right) \quad (7)$$

for a range-Doppler heatmap, the range-Doppler heatmap is calculated as follows:

$$P_{rd}(m,n) = \sum_{i=1}^{N} \sigma_i I\left(r_m - \frac{\Delta r}{2} \le r_i \le r_m + \frac{\Delta r}{2}\right) \cdot I\left(v_n - \frac{\Delta v}{2} \le v_i \le v_n + \frac{\Delta v}{2}\right) \quad (8)$$

wherein a change of a radial range r for centroid $b_i$ of facet i moving from time $t_1$ to time $t_2$ is defined as $\Delta r_{b_i}$, and the velocity of $b_i$ is $v_i = \dfrac{\Delta r_{b_i}}{t_2 - t_1}$.

3. The human body pose estimation method based on the radio frequency heatmap data enhancement according to claim 2, wherein a specific implementation process of the step S4 is as follows:
- S41, three preliminary heatmaps, namely range-azimuth heatmap, range-elevation heatmap and range-Doppler heatmap, are superimposed in a channel dimension to obtain input feature data $map_{coarse}$ with a shape of (3, Q, Q);
- S42, constructing a map2map network based on the U-net, and inputting $map_{coarse}$ into the network to obtain an output $map_{fine}$ with a shape of (3, Q, Q); the map2map network comprises an Encoder and a Decoder:

$$F_0 = \text{Encoder}(map_{coarse}, \theta^e) \quad (9)$$

$$map_{fine} = \text{Decoder}(F_0, \theta^d) \quad (10)$$

wherein $F_0$ is an intermediate feature; $\theta^e$ and $\theta^d$ are learnable parameters of a network module; and
- S43, training the map2map network based on the U-net, and using Adam optimizer to minimize a mean square error loss between $map_{coarse}$ and $map_{fine}$.

4. The human body pose estimation method based on the radio frequency heatmap data enhancement according to claim 3, wherein the step S41 is realized by following sub-steps:
- S411, Encoder comprises h layers of two-dimensional convolution, and each layer uses two-dimensional maximum pooling and two-dimensional batch normalization, and an activation function is ReLU; and
- S412, Decoder comprises h layers of two-dimensional deconvolution, and each layer uses two-dimensional batch normalization, and an activation function is ReLU, and finally the output $map_{fine}$ is obtained.

5. The human body pose estimation method based on the radio frequency heatmap data enhancement according to claim 4, wherein a specific implementation process of the step S5 is as follows:
- S51, mixing a final synthetic heatmap $map_{fine}$ with the real radar heatmap $map_{real}$ to obtain $map_{mix}$ and inputting $map_{mix}$ into the map2pose network based on convolutional neural network CNN, gated recurrent unit GRU and graph convolutional network GCN to obtain the human body pose skeleton; map2pose is defined as follows:

$$F_{1,i} = CNN_i(map_i, \theta_i^c); i \in \{ra, re, rd\} \quad (11)$$

$$F_{2,i} = GRU_i(F_{1,i}, \theta_i^g); i \in \{ra, re, rd\} \quad (12)$$

$$F_3 = \text{AdaptiveFusion}(F_{2,ra}, F_{2,re}, F_{2,rd}, \theta^a) \quad (13)$$

$$F_4 = GCN_{temporal}(F_3, \theta^{gt}) \quad (14)$$

$$F_5 = \text{Reshape}(F_4) \quad (15)$$

$$F_6 = GCN_{spatial}(F_5, \theta^{gs}) \quad (16)$$

$$F_{pose} = MLP(F_6, \theta^m) \quad (17)$$

wherein $map_i$, $i \in \{ra, re, rd\}$ is a result of $map_{mix}$ segmentation according to the channel dimension, and a shape is (1, Q, Q); $CNN_i$, $i \in \{ra, re, rd\}$ is a convolutional neural network, $GRU_i$, $i \in \{ra, re, rd\}$ is a gated recurrent unit, AdaptiveFusion is an adaptive fusion module, Reshape is a feature shape adjustment, $GCN_{temporal}$ and $GCN_{spatial}$ are graph convolutional neural networks, and MLP is a multilayer perceptron; $F_{j,i}$, $i \in \{ra, re, rd\}$ and $j \in \{1, 2, 3, 4, 5, 6\}$ are intermediate features; $\theta_i^c$, $\theta_i^g$, $i \in \{ra, re, rd\}$, $\theta^a$, $\theta^{gt}$, $\theta^{gs}$ and $\theta^m$ are learnable parameters of each network module; and $F_{pose}$ is a final output; and
- S52, training the map2pose network and using the Adam optimizer to minimize an average absolute error loss between a label value and a predicted value $F_{pose}$.

6. The human body pose estimation method based on the radio frequency heatmap data enhancement according to claim 5, wherein in step S51, the adaptive fusion module AdaptiveFusion is defined as follows:

$$F_3 = \alpha_{ra} \circ F_{2,ra} + \alpha_{re} \circ F_{2,re} + \alpha_{rd} \circ F_{2,rd} \quad (18)$$

$$\alpha_i = \text{Softmax}(W_i \cdot \text{Concat}(F_{2,ra}, F_{2,re}, F_{2,rd})), i \in \{ra, re, rd\} \quad (19)$$

wherein $\circ$ is an element multiplication, Softmax( ) is a normalized exponential function, and $W_i$ is a learnable parameter;
- a specific way of the feature shape adjustment Reshape is: linearly expanding $F_4 \in \mathbb{R}^{B \times J \times T \times C}$ into a one-dimensional sequence, and then performing arrangement and combination again according to a target shape ($B \times T \times J \times C$), wherein B is a batch size, J is a number of joint points, T is a time dimension size, and C is a channel dimension size, and obtaining $F_5 \in \mathbb{R}^{B \times J \times T \times C}$.

* * * * *